(No Model.)
A. L. BURTIS.
Mop-Wringer.
No. 228,601. Patented June 8, 1880.
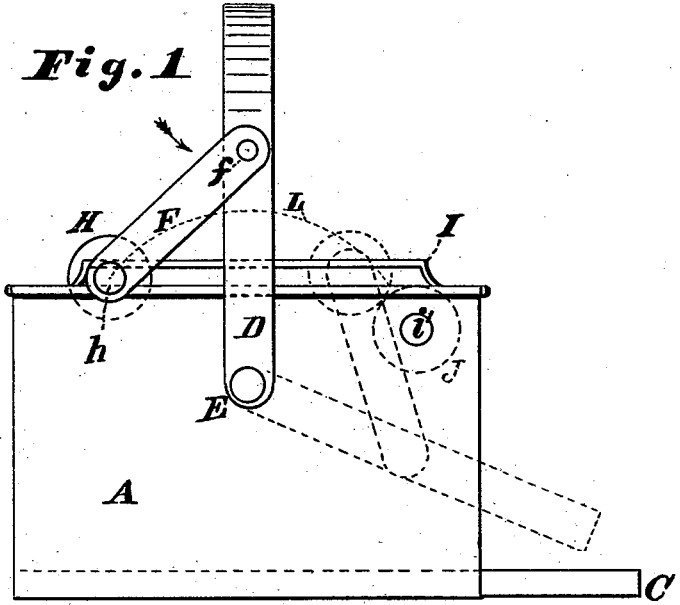
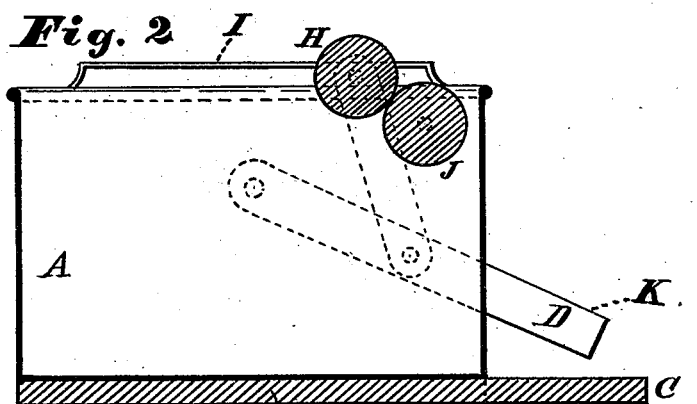
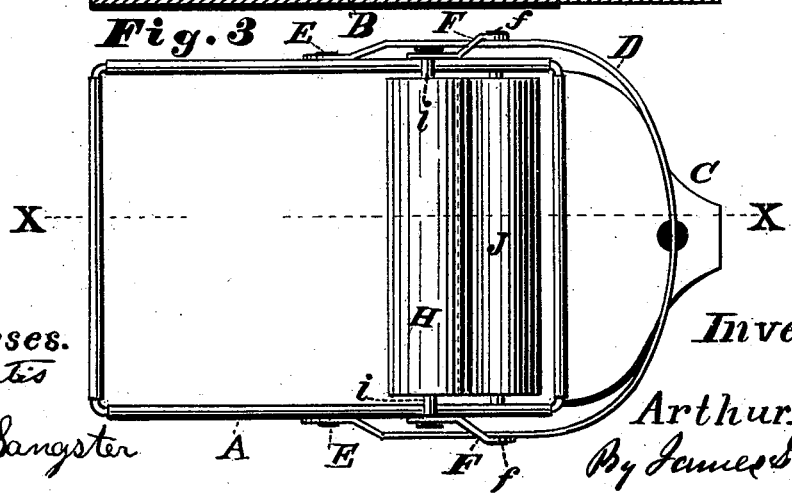
Witnesses.
D. H. Burtis
A. J. Sangster
Inventor.
Arthur L. Burtis.
By James Sangster
Atty.

United States Patent Office.

ARTHUR L. BURTIS, OF LOCKPORT, NEW YORK.

MOP-WRINGER.

SPECIFICATION forming part of Letters Patent No. 228,601, dated June 8, 1880.

Application filed March 22, 1880. (No model.)

*To all whom it may concern:*

Be it known that I, ARTHUR L. BURTIS, a citizen of the United States, residing in Lockport, in the county of Niagara and State of New York, have invented certain new and useful Improvements in Mop-Wringers, of which the following is a specification.

The object of my invention is to furnish a simple, convenient, and durable device for wringing a mop without the necessity of using the hands; and it consists of a suitable pail provided with a forwardly-projecting piece at the bottom, and the usual bail jointed to the pail by ears on the outside in the ordinary way, and having a roller arranged in suitable bearings at the front of the pail above the water, in combination with a roller connected to the ends of two arms, so as to turn easily therein, the opposite ends of which arms are jointed to the bail, so that the turning of the same up or down will cause the roller to move back and forth along the top of the pail in horizontal guideways, so that both rollers are above the level of the water in the pail at all times, as will be more clearly understood by reference to the drawings, in which—

Figure 1 is a side elevation; Fig. 2, a vertical longitudinal section through line X X, Fig. 3; and Fig. 3 represents a top view of the pail complete.

A represents the pail, made in the form of an oblong square and of sheet metal. It is provided with a wooden support, B, fastened to the bottom in any well-known way, and arranged to project forward, as at C, so as to prevent the pail from being overturned by the foot while operating the wringer.

D is an ordinary bail, jointed to the pail by ears E, in the usual way. To the bail D are jointed two arms, F F, at *f*, at the opposite end of which is a roller, H, arranged to turn easily in bearings *h* on said arms. The pivots *i* of roller H pass through slotted guideways I on the top of the pail, (see Figs. 1 and 2,) and then into the arms F F. This arrangement compels the roller H to move in a horizontal line back and forth on the top of the pail as the bail is raised or lowered.

The guideways I are placed one on each side of the upper edge of the pail. They are left off from Fig. 3, so as to show the rollers, pivots, and arms more clearly.

At the front part of the pail is a roller, J, in stationary bearings *i'*, arranged so as to turn freely therein.

The operation of the invention will be readily understood by reference to Figs. 1 and 2.

The mop-cloth is placed over the roller H in the direction of the arrow in Fig. 1, and the bail D is then brought down below the front edge of the pail into the position shown at K, Fig. 2, where it acts as a foot-step in a position near the base of the pail, where there is no danger of overturning the pail while operating, and where a slight pressure with the foot holds the rollers together sufficiently to force the water out of the mop-cloth as it is drawn out.

If desired, the arms F F may be rigidly fastened to the bail D. In that case the roller H would move in a curve above the pail, as shown by dotted line L in Fig. 1, the object being to keep both rollers above and out of the water and to provide a convenient foot-step at a point below the front of the pail, as shown in Figs. 1 and 2, for the purposes hereinbefore mentioned.

I am aware that a frame carrying a roller has been pivoted to a bucket provided with another roller, and that a swinging bail carrying a roller at the lower end has been used with a roller within the bucket; and I make no broad claim to the combination, with a bucket, of a roller and roller-carrying frame; but

I claim—

The combination, in a mop-wringer, of the pail A, provided with a roller, J, a bail, D, pivoted at the lower end to the pail, and arms F F, carrying a roller, H, and connected at the upper ends to the bail, as and for the purposes described.

ARTHUR L. BURTIS.

Witnesses:
 D. H. BURTIS,
 JAMES SANGSTER.